United States Patent [19]

Ohno

[11] Patent Number: 5,901,191
[45] Date of Patent: *May 4, 1999

[54] BAUD RATE MIXING TRANSMISSION SYSTEM

[75] Inventor: Yoshiaki Ohno, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/587,963

[22] Filed: Jan. 17, 1996

[30] Foreign Application Priority Data

Jan. 18, 1995 [JP] Japan ................................ 7-005584

[51] Int. Cl.⁶ .................................................. H04L 23/00
[52] U.S. Cl. ......................... 375/377; 375/225; 375/377; 370/465
[58] Field of Search ................................. 375/219, 222, 375/225, 377, 259, 285; 370/465

[56] References Cited

U.S. PATENT DOCUMENTS

| | | | |
|---|---|---|---|
| 4,894,847 | 1/1990 | Tjahjadi et al. | 375/377 |
| 4,931,250 | 6/1990 | Greszczuk | 375/377 |
| 4,956,851 | 9/1990 | Wolensky et al. | 375/377 |
| 5,008,902 | 4/1991 | Key et al. | 375/377 |

*Primary Examiner*—Chi H. Pham
*Assistant Examiner*—Bryan Webster
*Attorney, Agent, or Firm*—Foley & Lardner

[57] ABSTRACT

A baud rate mixing transmission system includes a transmission apparatus and a reception apparatus. The transmission apparatus transmits data signals at predetermined different baud rates at time intervals. The transmission apparatus adds a baud rate switching signal indicating a baud rate of a data signal to the data signal. The reception apparatus detects the baud rate switching signal added to the data signal from the transmission apparatus, and receives the data signal in accordance with the detected baud rate switching signal.

9 Claims, 4 Drawing Sheets

BAUD RATE MIXING TRANSMISSION SYSTEM

BACKGROUND OF THE INVENTION

The present invention relates to a baud rate mixing transmission system for transmitting data signals at a plurality of different transmission rates (baud rates) at time intervals, and receiving transmitted data signals in accordance with corresponding baud rates.

As the first apparatus for receiving data signals transmitted at a plurality of different baud rates at time intervals, a data reception apparatus is disclosed in, e.g. Japanese Patent Laid-Open No. 5-83328. This first apparatus includes a generating means for generating clock signals corresponding to a plurality of baud rates such as 200 bps, 600 pbs, and 1,200 pbs. When a data signal is to be received, the transmitted data signal is sampled to discriminate a synchronization pattern, and a baud rate is calculated from the discriminated synchronization pattern. A corresponding reception clock signal is selected from the generating means on the basis of this calculation result, and subsequent data reception is performed on the basis of the selected reception clock signal The second apparatus disclosed in Japanese Patent Laid-Open No. 1-238338 includes two types of data interval detecting circuits for detecting the specific baud rates of data signals from the transmitted data signals, and a count circuit for sampling input data with an external clock signal. Detection results obtained by the respective detecting circuits are supplied, as control signals, to gate circuits arranged for the respective baud rates. A data signal having a desired baud rate is output from the output terminal of a gate circuit corresponding to the desired baud rate.

In the first apparatus described above, since a specific timing at which the baud rate of a data signal transmitted from the transmission side changes is unknown on the reception side, a baud rate is determined by using a synchronization pattern. In the second apparatus, when a data signal transmitted from the transmission side is to be received, a data interval is set for the data signal to determine a specific baud rate.

In both the apparatuses, therefore, when a data signal transmitted from the transmission side is to be received on the reception side, detection processing must be performed while expecting all baud rate values from the data signal. In the first apparatus, in particular, baud rate detection processing is complicated. In the second apparatus, a complicated, large-size detection circuit is required.

Furthermore in both the apparatuses since a baud rate is directly detected from a data signal transmitted from the transmission side, the processing time between the instant at which a baud rate changes and the instant at which this baud rate is detected is required. During such a detection processing time, therefore, received data cannot be properly detected on the reception side. Consequently, the received data during this time is lost.

SUMMARY OF THE INVENTION

It is an object of the present invention to provide a baud rate mixing transmission system in which when data signals having different baud rates are mixed and transmitted on one line, the baud rates can be simply and easily detected, and the data signals can be accurately and quickly received.

In order to achieve the above object, according to the present invention, there is provided a baud rate mixing transmission system comprising a transmission apparatus for transmitting data signals at predetermined different baud rates at time intervals, the transmission apparatus adding a baud rate switching signal indicating a baud rate of a data signal to the data signal, and a reception apparatus for detecting the baud rate switching signal added to the data signal from the transmission apparatus, and receiving the data signal in accordance with the detected baud rate switching signal.

DESCRIPTION OF THE PREFERRED EMBODIMENTS

The present invention will be described below with reference to the accompanying drawings.

Figure 1:
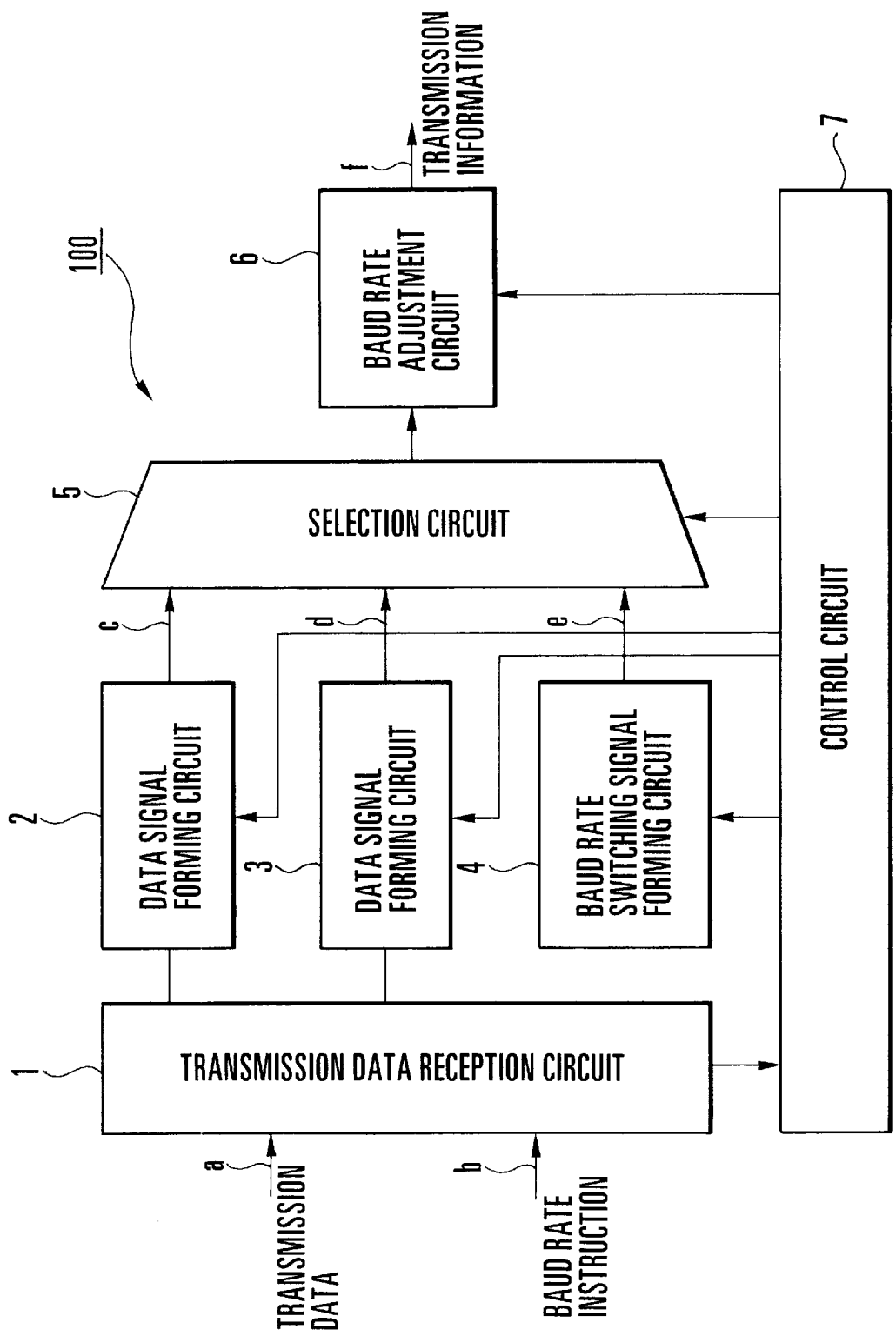
FIG. 1 is a block diagram showing an embodiment of a transmission apparatus constituting a baud rate mixing transmission system according to the present invention.

FIG. 1 shows a transmission apparatus constituting a baud rate mixing transmission system according to the present inventions which will be described by taking a case wherein data signals having two different baud rates A and B coexist along the time axis and transmitted to the reception side through one line.

Referring to a transmission apparatus 100 in FIG. 1, reference numeral 1 denotes a transmission data reception circuit for receiving transmission data a to be transmitted to the reception side and a baud rate instruction b of the transmission data a; 2, a data signal forming circuit for forming transmission data c having a baud rate A as transmission data to be transmitted to the reception side; 3, a data signal forming circuit for forming transmission data d having a baud rate B as transmission data; 4, a baud rate switching signal forming circuit for forming a baud rate switching signal e (to be described later); 5, a selection circuit for receiving the transmission data c and d and the baud rate switching signal e and selecting and outputting one of them; 6, a baud rate adjustment circuit for adjusting the transmission data or the baud rate switching signal selected by the selection circuit 5 to the designated baud rate; and 7, a control circuit for performing transmission control of the overall system.

The operation of the transmission apparatus 100 having the above arrangement will be described next. Upon reception of the transmission data a to be transmitted to the reception side and the baud rate instruction b indicating the transmission rate of the transmission data, the transmission data reception circuit 1 sends the received transmission data a to one of the data signal forming circuits 2 and 3 in accordance with the designated baud rate, and outputs the baud rate instruction b to the control circuit 7. That is, the transmission data reception circuit 1 serves as a transmission information distribution means for distributing input transmission data to the data signal forming circuits 2 and 3 in accordance with the baud rate instruction b.

When the transmission data a from the transmission data reception circuit 1 is input to the data signal forming circuit 2, the circuit 2 forms the transmission data a into the transmission data c having the baud rate A and outputs it to the selection circuit 5. When the transmission data a from the transmission data reception circuit 1 is input to the data signal forming circuit 3, the circuit 3 forms the input transmission data a into the transmission data d having the baud rate B and outputs it to the selection circuit 5.

The baud rate switching signal forming circuit 4 forms the baud rate switching signal e to be added to the start portions of the transmission data c and d from the data signal forming circuits 2 and 3 on the basis of the baud rate instruction from the control circuit 7, and outputs the signal e to the selection circuit 5. The baud rate switching signal e designates the baud rates of the transmission data c and d to which the signal is to be added.

In this case, the selection circuit 5 alternately switches and outputs the baud rate switching signal e from the baud rate switching signal forming circuit 4 and one of the transmission data c and d from the data signal forming circuits 2 and 3 to the baud rate adjustment circuit 6.

The baud rate adjustment circuit 6 adjusts the baud rate switching signal e or one of the transmission data c and d from the selection circuit 5 to the baud rate designated by the control circuit 7 and sends the resultant data or signal, as transmission information f, to a regenerative repeater (to be described later) as the reception side.

As described above, in the transmission apparatus 100, transmission data to be transmitted to the reception side is formed under the control of the control circuit 7, the baud rate switching signal e indicating a baud rate is added to the formed transmission data, and the resultant data is transmitted to the reception side.

Figure 4:
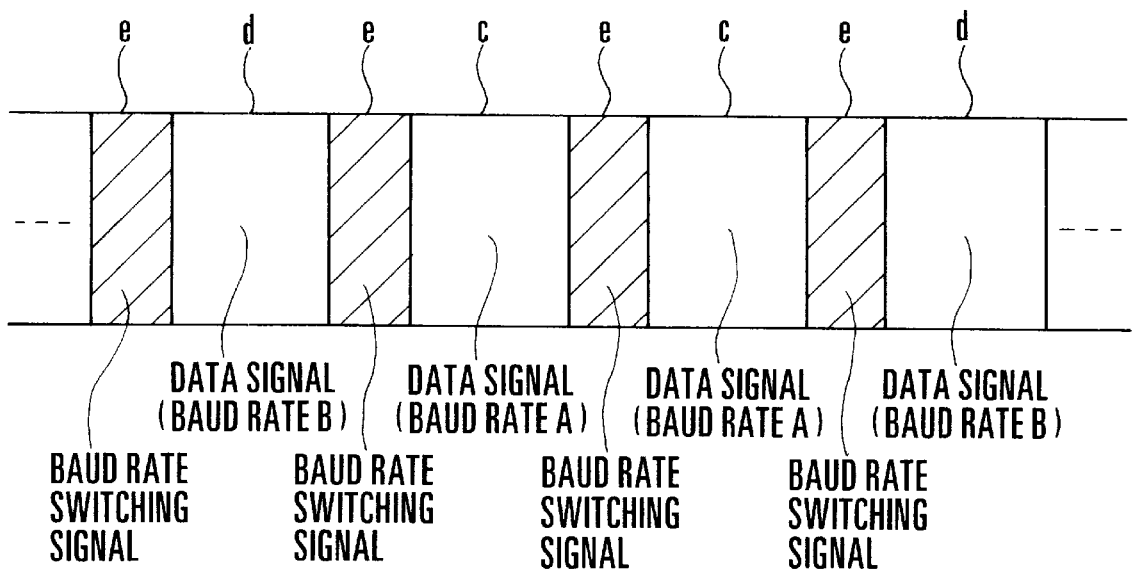
FIG. 4 is a view showing the format of transmission information to be transmitted.

FIG. 4 shows the format of transmission information formed by the transmission apparatus 100. Referring to FIG. 4, as described above, the baud rate switching signal e is added to the start portions of the transmission data c and d which have arbitrary data lengths and are to be transmitted at the baud rates A and B. In this case, the baud rate of the baud rate switching signal e is set to one of the baud rates A and B similar to transmission data.

Figure 2:
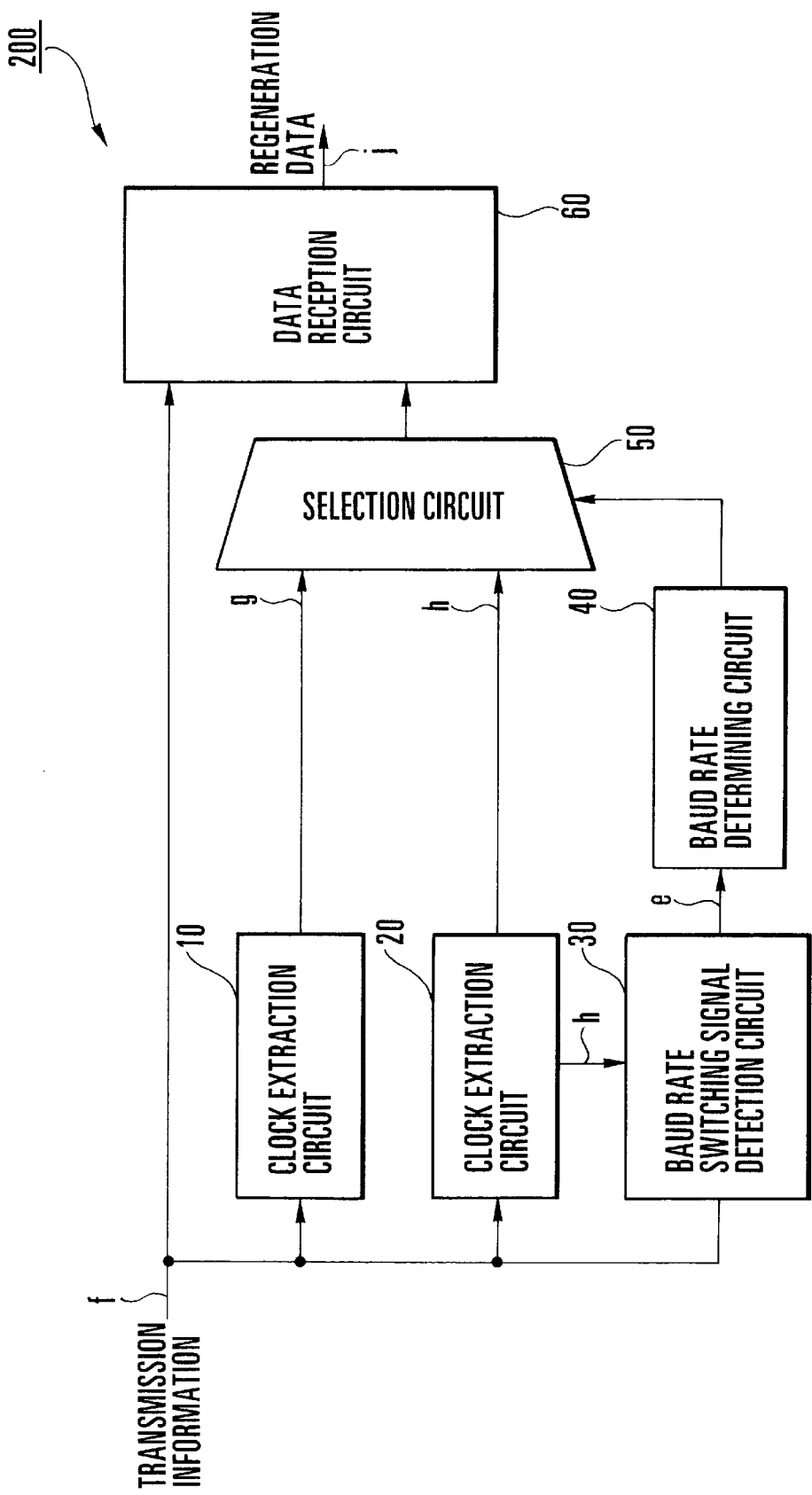
FIG. 2 is a block diagram showing an embodiment of a regenerative repeater constituting the baud rate mixing transmission system according to the present invention.

FIG. 2 shows an embodiment of a regenerative repeater constituting the baud rate mixing transmission system according to the present invention. Assume that the transmission information f transmitted from the transmission apparatus in FIG. 1 is received to be regenerated/repeated. A data signal to be processed by a regenerative repeater 200 is transmitted at either the baud rate A or the baud rate B as in the case of the transmission apparatus 100. The baud rate of the baud rate switching signal e to be processed by the regenerative repeater 200 is the baud rate B.

Referring to the regenerative repeater 200 in FIG. 2, reference numeral 10 denotes a clock extraction circuit for extracting a clock signal g for data reception in accordance with the baud rate A set in advance from data transmitted from the transmission apparatus 100; 20, a clock extraction circuit for extracting a clock signal h for data reception in accordance with the baud rate B set in advance from data transmitted from the transmission apparatus 100; 30, a baud rate switching signal detection circuit for detecting the baud rate switching signal e transmitted from the transmission apparatus in accordance with the baud rate B unique to this system; 40 a baud rate determining circuit for determining the baud rate of a data signal following the baud rate switching signal e in accordance with the baud rate switching signal e from the baud rate switching signal detection circuit 30; 50, a selection circuit for selecting one of the clock signals g and h extracted by the clock extraction circuits 10 and 20 on the basis of the baud rate from the baud rate determining circuit 40; and 60, a data reception circuit for receiving and regenerating a data signal in the transmission information f in accordance with the clock signal from the selection circuit 50, and relays the data signal as regeneration data j to the next apparatus side.

Figure 5:
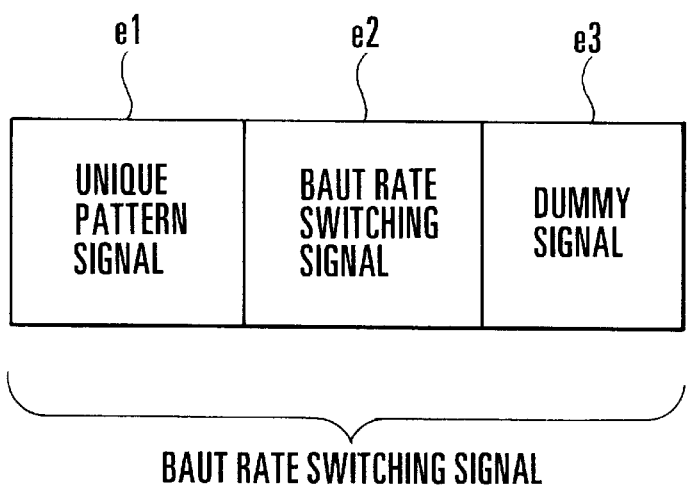
FIG. 5 is a view showing the format of a baud rate switching signal.

FIG. 5 shows the format of the baud rate switching signal e described above. In this case, the baud rate switching signal e consists of a unique pattern signal e1 for identifying the baud rate switching signal e, a baud rate switching instruction signal e2 for designating the baud rate of a succeeding data signal in advance with respect to the reception side, and a dummy signal e3 set in consideration of a time interval during which a clock signal extracted from a data signal is disturbed upon switching of baud rates on the reception side.

The operation of the regenerative repeater 200 will be described next with reference to the block diagram in FIG. 2 and the signal format in FIG. 5. When the transmission information f is transmitted from the transmission apparatus the clock extraction circuit 10 extracts the clock signal g from the transmission data in the transmission information f in accordance with the baud rate A, and sends the extracted signal to the selection circuit 50. The clock extraction circuit 20 extracts the clock signal h from the transmission data in accordance with the baud rate B, and sends the extracted signal to the selection circuit 50.

In detecting the baud rate switching signal e from the transmission information f, since the baud rate of the baud rate switching signal e is set to be equal to the baud rate B, the baud rate switching signal detection circuit 30 detects the baud rate switching signal e from the unique pattern signal e1 constituting the baud rate switching signal e and shown in FIG. 5 on the basis of the clock signal h obtained from the clock extraction circuit 20, and outputs the detection signal to the baud rate determining circuit 40.

The baud rate determining circuit 40 extracts the baud rate switching instruction signal e2 in FIG. 5 from the baud rate switching signal e output from the baud rate switching signal detection circuit 30, and determines the baud rate of a succeeding data signal. The baud rate determining circuit 40 then notifies the selection circuit 50 of the determined baud rate information The selection circuit 50 selects a clock signal for reception and regeneration of transmission data transmitted from the transmission apparatus 100 from the clocks signals g and h extracted by the clock extraction circuits 10 and 20 on the basis of the baud rate information from the baud rate determining circuit 40, and supplies the selected signal to the data reception circuit 60. As a result, the data reception circuit 60 receives and regenerates the transmission data on the basis of one of the clock signals g and j which is selected by the selection circuit 50, and relays the data as the regeneration data j to the next apparatus side.

As described above, the regenerative repeater 200 receives the baud rate switching signal e added to the start portion of transmission data transmitted from the transmission apparatus 100, and determines the baud rate of the transmission data. In addition, the regenerative repeater 200 receives and regenerates succeeding transmission data in accordance with the determined baud rate, and relays the data to the next apparatus side. Therefore, when data signals having a plurality of different baud rates coexist along the time axis and transmitted from the transmission apparatus 100 through one line, these data signals can be accurately and easily received and regenerated on the reception side.

Figure 3:
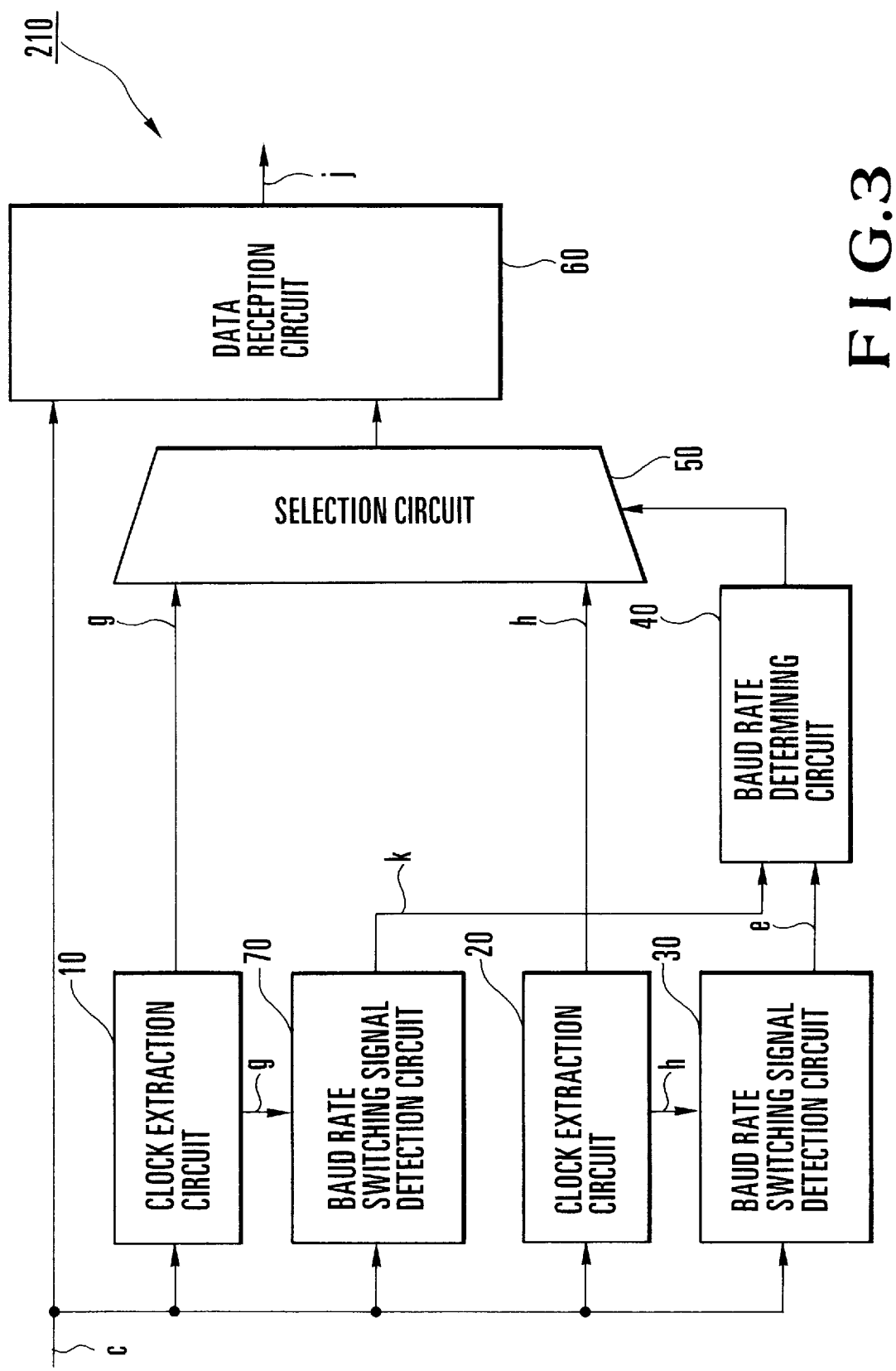
FIG. 3 is a block diagram showing another embodiment of the regenerative repeater constituting the baud rate mixing transmission system according to the present invention.

An output from the data reception circuit 60 is disturbed for a while immediately after the baud rate determining circuit 40 designates switching/selection of a clock signal with respect to the selection circuit 50, because each of the clock extraction circuits 10 and 20 adjusts the phase of a clock signal in accordance with a data signal to be received. For this reason, as shown in FIG. 5, the dummy signal e3 is added to the end portion of the baud rate switching signal e to absorb the above adjustment time. In this case, the dummy signal e3 is received and regenerated at a baud rate after a switching operation, and a data signal is received and regenerated at the baud rate after the switching operation by using a clock signal having undergone switching and having no disturbance after the lapse of the above adjustment time. As a result, a data signal following the dummy signal e3 can be accurately regenerated FIG. 3 shows another embodiment of the regenerative repeater constituting the system of the present invention. In addition to the arrangement of the regenerative repeater in FIG. 2, a regenerative repeater 210 of this embodiment includes a baud rate switching signal detection circuit 70 for receiving a clock signal g from a clock extraction circuit 10, detecting a baud rate switching signal k having a baud rate A from a data signal, and outputting the signal to a baud rate determining circuit 40.

With the use of a baud rate switching signal detection circuit 30 and the baud rate switching signal detection circuit 70 for detecting a baud rate B and the baud rate A of baud rate switching signals, a system in which a baud rate switching signal is transmitted at, e.g., the low baud rate B can be easily changed into a system in which a baud rate switching signal is transmitted at the high baud rate A. If the baud rate determining circuit 40 is designed to determine from the output states of the baud rate switching signal detection circuits 30 and 70 whether the currently received baud rate switching signal is a signal having the baud rate A or B, baud rate switching signals can be transmitted at a plurality of baud rates in the same system.

As has been described above, according to the present invention, a data signal is transmitted while a baud rate switching signal indicating the baud rate of the data signal is added thereto, and the data signal is received upon detection of this baud rate switching signal on the reception side. With this operation, when data signals having different baud rates coexist and transmitted through one line, the baud rate of each signal can be simply and easily detected on the reception side. Each data signal can therefore be received accurately and quickly.

When transmission data and a baud rate instruction for designating the transmission rate of the transmission data are received, the transmission data is formed as a data signal corresponding to a predetermined baud rate. In additions a baud rate switching signal is formed on the basis of the baud rate instructions and the formed baud rate switching signal and one of the data signals which is based on the baud rate instruction are alternately selected/output. With this operations the transmission data and the baud rate switching signal can be accurately transmitted to the reception side.

A clock signal for data reception is extracted from a data signal for each predetermined baud rate, and a baud rate switching signal is detected in accordance with a predetermined clock signal of the extracted clock signals. Meanwhile, the baud rate of a succeeding data signal is determined on the basis of the detected baud rate switching signal, and one of the extracted clock signals is selected in accordance with the determination result. A data signal is then received on the basis of the selected clock signal. With this operation, data signals having different baud rates can be reliably received with a simple arrangement.

In addition, this system includes a detection means in correspondence with each of extracted clock signals. The detection means detects a baud rate switching signal in accordance with each clock signal. If, therefore, the system in which, for examples the baud rate of a currently used baud rate switching signal is low can be easily changed into a system in which the baud rate of a baud rate switching signal is high.

Since a baud rate switching signal consists of a baud rate switching instruction signal for designating switching of baud rates, and a dummy signal, reception of a data signal is avoided while an extracted clock signal is disturbed upon switching of baud rates, thereby allowing reliable reception of a data signal.

What is claimed is:

1. A baud rate mixing transmission system comprising:

a transmission apparatus for mixing and transmitting data signals on one line at predetermined different baud rates at different time intervals, said transmission apparatus adding a baud rate switching signal indicating a baud rate of a data signal to the data signal; and a reception apparatus for detecting the baud rate switching signal added to the data signal from said transmission apparatus, and receiving the data signal in accordance with the detected baud rate switching signal, wherein said baud rate switching signal has a fixed baud rate, and wherein mixing and transmitting data signals at different baud rates is performed in one connection between said transmission apparatus and said reception apparatus.

2. A baud rate mixing transmission system comprising:

a transmission apparatus for transmitting data signals at predetermined different baud rates at time intervals, said transmission apparatus adding a baud rate switching signal indicating a baud rate of a data signal to the data signal; and a reception apparatus for detecting the baud rate switching signal added to the data signal from said transmission apparatus, and receiving the data signal in accordance with the detected baud rate switching signal, wherein said transmission apparatus comprises:

transmission data distribution means for distributing transmission data in accordance with a baud rate instruction for designating a transmission rate;

data signal forming means for receiving each transmission from each said transmission data distribution means and forming a data signal having a baud rate corresponding to the baud rate instruction;

baud rate switching signal forming means for forming a baud rate switching signal in accordance with the baud rate instruction;

selection means for selecting and outputting each data signal from said data signal forming means on the basis of a baud rate instruction, said selection means adding the baud rate switching signal from said baud rate switching signal forming means to a portion immediately before the selected data signal; and transmission data adjustment means for adjusting the data signal having the baud rate switching signal added thereto and supplied from said selection means to a baud rate corresponding to the baud rate instruction, and transmitting the data signal.

3. A system according to claim 2, wherein said data signal forming means comprises a first signal forming circuit for receiving first transmission data from said transmission data distribution means and forming a data signal having a first baud rate in accordance with a baud rate instruction, and a second signal forming circuit for receiving second transmission data from said transmission data distribution means and forming a data signal having a second baud rate in accordance with a baud rate instruction, and said selection means selectively outputs the first and second data signals from said first and second signal forming circuits in accordance with the baud rate instructions.

4. A baud rate mixing transmission system comprising:

a transmission apparatus for transmitting data signals at predetermined different baud rates at time intervals, said transmission apparatus adding a baud rate switching signal indicating a baud rate of a data signal to the data signal; and a reception apparatus for detecting the baud rate switching signal added to the data signal from said transmission apparatus, and receiving the data signal in accordance with the detected baud rate switching signal, wherein said reception apparatus comprises:

clock extraction means for extracting a clock signal for data reception from a data signal transmitted from said transmission apparatus for each baud rate;

detection means for detecting a baud rate switching signal added to the data signal from said transmission apparatus by using at least one of clock signals from said clock extraction means;

determination means for determining a baud rate of a succeeding data signal on the basis of the baud rate switching signal from said detection means;

selection means for selecting one of the clock signals from said clock extraction means in accordance with the determination output from said determination means; and regeneration means for receiving and regenerating the data signal from said transmission apparatus by using a clock signal from said selection means.

5. A system according to claim 4, wherein said clock extraction means comprises a first extraction circuit for extracting a first clock signal for a first baud rate from a data signal transmitted from said transmission apparatus, and a second extraction circuit for extracting a second clock signal for a second baud rate from a data signal transmitted from said transmission apparatus, and said baud rate detection means detects a baud rate switching signal added to the data signal from said transmission apparatus by using one of the first and second clock signals from said first and second extraction means.

6. A system according to claim 4, wherein said clock extraction means comprises a first extraction circuit for extracting a first clock signal for a first baud rate from a data signal transmitted from said transmission apparatus, and a second extraction circuit for extracting a second clock signal for a second baud rate from a data signal transmitted from said transmission apparatus, said baud rate detection means comprises a first detection circuit for detecting a first baud rate switching signal added to a data signal from said transmission apparatus by using a first clock signal from said first extraction circuit, and a second detection circuit for detecting a second baud rate switching signal added to a data signal from said transmission apparatus by using a second clock signal from said second extraction circuit, and said determination means determines a baud rate of a succeeding data signal in accordance with one of the first and second baud rate switching signals from said first and second detection circuits.

7. A baud rate mixing transmission system comprising:

a transmission apparatus for transmitting data signals at predetermined different baud rates at time intervals, said transmission apparatus adding a baud rate switching signal indicating a baud rate of a data signal to the data signal; and a reception apparatus for detecting the baud rate switching signal added to the data signal from said transmission apparatus, and receiving the data signal in accordance with the detected baud rate switching signal, wherein said baud rate switching signal added to said data signal from said transmission apparatus includes a baud rate switching instruction signal indicating designation of switching of baud rates, and a dummy signal following the baud rate switching instruction signal.

8. A baud rate mixing transmission system comprising a transmission apparatus for transmitting data signals at predetermined different baud rates at time intervals, and a reception apparatus for receiving a data signal from said transmission apparatus in accordance with a corresponding baud rate, said transmission apparatus including transmission data distribution means for distributing transmission data to be transmitted in accordance with a baud rate instruction for designating a transmission rate, data signal forming means for receiving each transmission data from said transmission data distribution means and forming a data signal having a baud rate corresponding to the baud rate instruction, baud rate switching signal forming means for forming a baud rate switching signal in accordance with the baud rate instruction, selection means for selecting and outputting each data signal from said data signal forming means on the basis of a baud rate instruction, said selection means adding the baud rate switching signal from said baud rate switching signal forming means to a portion immediately before the selected data signal, and transmission data adjustment means for adjusting the data signal having the baud rate switching signal added thereto and supplied from said selection means to a baud rate corresponding to the baud rate instruction, and transmitting the data signal, and said reception apparatus including clock extraction means for extracting a clock signal for data reception from a data signal transmitted from said transmission apparatus in accordance with a predetermined baud rate, detection means for detecting a baud rate switching signal added to the data signal from said transmission apparatus by using at least one of clock signals from said clock extraction means, determination means for determining a baud rate of a succeeding data signal on the basis of the baud rate switching signal from said detection means, selection means for selecting one of the clock signals from said clock extraction means in accordance with the determination output from said determination means, and regeneration means for receiving and regenerating the data signal from said transmission apparatus by using a clock signal from said selection means.

9. A system according to claim 8, wherein a baud rate switching signal added to a data signal from said transmission apparatus includes a baud rate switching instruction signal indicating designation of switching of baud rates, and a dummy signal following the baud rate switching instruction signal.

* * * * *